Aug. 13, 1946.  O. A. KNOPP  2,405,656

POWER SURVEY INSTRUMENT

Filed March 15, 1940

OTTO A. KNOPP
*INVENTOR.*

BY
*ATTORNEYS.*

Patented Aug. 13, 1946

2,405,656

UNITED STATES PATENT OFFICE 2,405,656

POWER SURVEY INSTRUMENT

Otto A. Knopp, Oakland, Calif.

Application March 15, 1940, Serial No. 324,119

12 Claims. (Cl. 171—34)

This invention relates to electrical power survey methods and equipment and particularly to practical methods and apparatus for conducting such surveys at points of consumption of single-phase alternating power.

It is well known that the cost of power distribution mounts rapidly with decrease in power factor. Until recently small industrial loads have generally been treated as operating at a uniformly high power factor because not until recent times have loads of reactive character, such as inhere in fluorescent lamps and lighting systems of high reactance, been generally introduced.

Equitable treatment of consumers requires that a distinction be made between consumers operating on different power factors, but to do this requires some means of determination of the individual power factor. The usual voltampere and power factor meters are not employed because of their high relative cost to the loads consumed.

The present invention contemplates the employment of a device by which the consumer's circuit can be tested from time to time to determine the character of the power factor prevailing on the circuit. By nature, this instrument must be portable and of low cost. It is desirable also that the exact nature of the power supply be determined at the time the test is made, that is, the exact frequency of the supply should be known as a value simultaneously existing with the observed power factor and watts.

Because of the wide range of consumer loads, and because actual load conditions must be tested, the accuracy of the measuring instrument must extend over an extraordinarily large power range, and yet the amount of apparatus must be minimal in favor of cost and portability.

Since the observations are to be made in respect to small blocks of load, the personnel cost factor is to be kept to a minimum. Accordingly, the instrument should be such as can be used by the unskilled observer by following simple directions, and that minimum calculations need be made from the observations as recorded by the observer.

It is an object of this invention to provide a substantially unitary test set conforming to requirements of the character referred to above, as well as to embody other features of advantage as will appear from the following description having reference to the accompanying drawing, in which.

Figure 1:
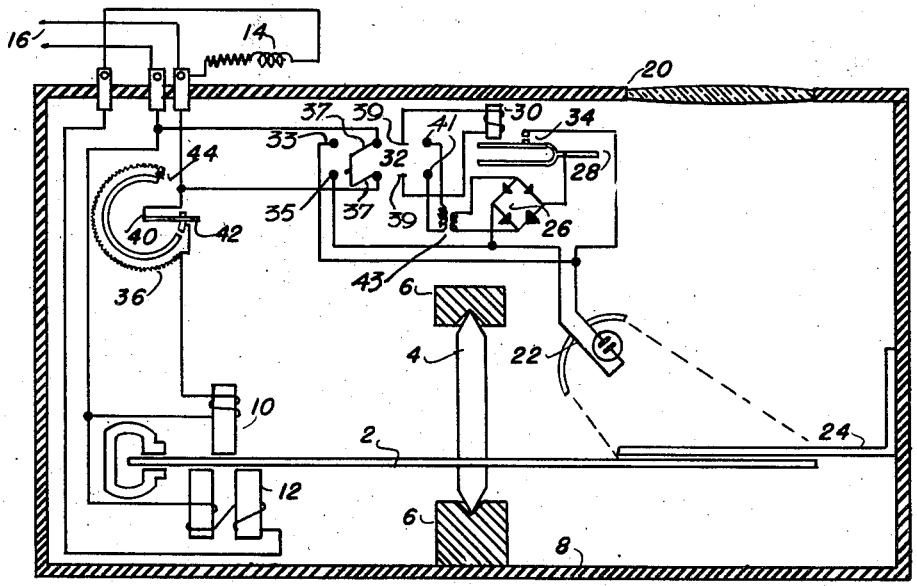
Fig. 1 is an elevational section of the set.

The instrument comprises elements corresponding to the motive elements of the customary induction type watthour meter; having a rotor disc 2 secured for rotation on a spindle 4 suitably pivoted in bearings 6 fastened to a case 8, and fixed potential and current coil and field magnets 10 and 12 connected in the usual manner for driving disc 2 at a speed proportional to the power supplied to a consumer's circuit 14 from single-phase supply lines 16. The usual lag and no-load adjustments may be provided in order to insure the usual degree of sensitivity and accuracy throughout the load range and irrespective of power factor. The usual registering devices may be dispensed with where an indicating instrument is wanted.

The speed of the disc is a function of the wattage, and is directly determined by observing which one of a plurality of concentric rings 18 on the disc appears to be stationary when intermittently illuminated. To this end the case 8 is enclosed so as to be free from exterior light and an opening 20 is provided in the top of the instrument so that a portion of all of the concentric rings 18 can be viewed by reflected light from a periodically excited lamp 22. Lamp 22 is of such character that its period of light generation is simultaneous with application of a minimum crest voltage, and may, accordingly, be a glow or neon gas lamp.

For purposes of indicating watts and power factor the frequency of occurrence of light from lamp 22 might be any arbitrary frequency, but it is desired to determine, with facility, the frequency of the supply circuit alternations, and in order to do this with a minimum of complication of apparatus and method, the surface of the disc at 18 is illuminated at the exact standard frequency of the power supply, which may be 60 cycles per second. By using a lamp of the neon gas-filled glow type, the terminals of which are arranged so that one screens the other from projecting light on the disc, the normal standard frequency in cycles per second may be used, only one-half of the applied alternating voltage wave producing effective light when blades 37 contact terminals 33 and 35; that is, 60 illuminations of the disc per second.

Each of the various rings, 18a, 18b, etc., is made up of equiangular arcs of alternate blackness and lightness. Each ring has a different number of such arcs, in accordance with the speed of the ring for its assigned wattage significance. The outer ring, which has the greatest linear speed for any power, is preferably assigned the lowest power. Thus, supposing the power which it is to indicate, to be 250 watts, and supposing the speed of rotation of disc 2 at this power is such that one revolution occurs in 8.64 seconds, the number of black and white arc combinations will be 60×8.64, the 60 factor being the frequency of light falling on the disc at 18.

Accordingly, when the true power consumed is 250 watts, this ring 18a will appear to be standing still, and, inversely, when the ring appears to stand still, the observer is thereby informed that the power being consumed is 250 watts. Several rings, of uniform radial width, and of progressively increasing wattage significance, are placed within the ring 18a, each ring having a proper number of black and white combinations in accordance with the wattage it is to indicate when it appears to stand still.

Since the speed of an induction watthour disc of this character is unusually accurately proportional to the wattage, the number of such black-and-white combinations should vary inversely as the wattage indicated by the particular ring. Therefore, in the case supposed, the ring for 600 watts would require only 216 black and white combinations. It is because the lower wattages require the larger number of segments that it is preferred to assign the lower wattage circles the greatest geometrical radius from the spindle, their size being proportional to the radius.

Adjacent rings are assigned wattages of successively equal difference for the sake of providing a uniform straightline scale with which to identify any particular ring which appears stationary. Outside this fact, and the fact that this order is of significance for frequency measurements, the rings need not be arranged in any definite order with respect to wattage.

In order to identify the rings there is provided a fixed scale piece 24 having its scale edge lying on a disc radius in the field of view and over the disc to just clear the same to avoid parallax. The scale is graduated and marked in exact visual juxtaposition to the mean arcs of the rings. The scale is, therefore, uniform.

The accuracy of power indication by an induction watthour meter is not greatly affected by variation of frequency, but it is necessary to determine the frequency for survey purposes. Also, the indications of the disc 2 utilising the stroboscopic principle, require that the frequency of the light source 22 be constant, that is, unaffected by the supply frequency variations however slight, when power, power factor, and calibration for frequency measurements, are being obtained, as will be explained.

Lamp 22 is accordingly given illumination at the desired or standard supply frequency from a fixed standard frequency source, as a rectifier 26, the direct current output circuit of which is interrupted at the desired frequency say 60 times per second by a tuning fork 28. Tuning fork 28 is set in vibration at the time a wattage indication or power factor reading is to be taken, by means of a momentarily excited alternating current solenoid 30, the circuit of which is momentarily energized as a control switch 32 is moved to energize the circuit of the rectifier. Since the circuit for solenoid 30 is only momentarily energized, as by causing the contacts 39—39 thereof at switch 32 to be momentarily contacted by the blades 37 of switch 32 and disconnected from said blades just prior to completion of movement of the switch blades to energize the rectifier 26, the tuning fork 28 vibrates at its own natural frequency of 60 vibrations per second for a fixed length of time, and does not depend for its frequency of vibration on the frequency of the circuit 16.

Accordingly, the tuning fork is set into vibration just before the rectifier 26 is energized, and will remain in vibration for a short time, sufficient to permit a reading, a calibration, and a power factor determination. When the tuning fork ceases to vibrate, the circuit of lamp 22 is permanently open, so that the scale cannot be seen, the cessation being an indication to the operator that the standard frequency circuit is in use for making readings of watts, power factor, and calibration for frequency determination.

By this arrangement the standard frequency current cannot be supplied when line frequency is applied to the lamp 22, it being necessary to operate switch 32 to energize solenoid 30 and also to energize the direct current source 26. Also, by this arrangement, line voltage will not be supplied across the rectifier 26, since the tuning fork switch 34 is open except upon excitation of solenoid 30 incident to closure of the rectifier supply circuit.

In operation, power being supplied to the instrument and load 14 as shown from line 16, the disc 2 is rotating. In order to determine the amount of power being consumed, the observer looks into the window and throws the switch 32 to the right, as illustrated in the drawing, thus setting the tuning fork 28 into vibration, energizing the rectifier 26 and delivering a tuning fork standard frequency of say 60 illuminations per second to the surface of the disc at 18. If ring 18a appears to be stationary, the observer identifies it as the 250 watt ring from the scale 24.

In order to determine the power factor, the normally inductively reactive potential coil current, through potential coil 10, which, in the induction wattmeter at unity power factor, is very close to 90 degrees out of phase with the load current through current coils 12, is altered from such phase relation by inserting phase altering impedance in the potential circuit of character and amount sufficient only to physically stop the rotation of disc 2.

This additional impedance may take the form of a resistor 36 which may be inserted in the potential circuit by an actuator knob 38 which acts through the shaft 40 on a radial contact brush 42. A small condenser 44 may be placed across the resistor to increase the effectiveness at very high power factor. The effect of inserting this impedance is to diminish the phase angle between the potential coil current and the current coil current, and the amount of change of this impedance necessary to stop the disc 2 from the determined power speed, is a function of the load power factor. Accordingly, the scale 46 for the impedance 36 is calibrated in power factor.

Figure 2:
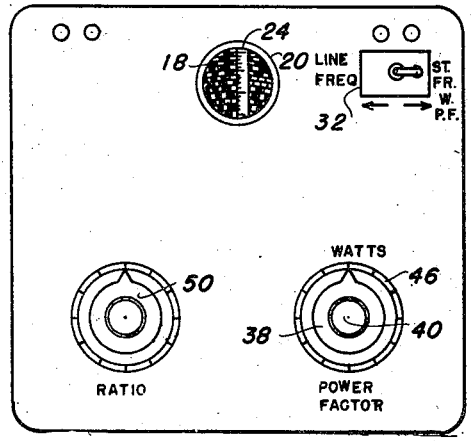
Fig. 2 is a plan view of the instrument.
Figure 3:
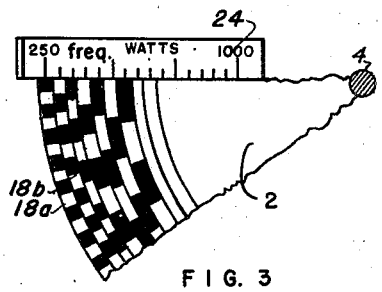
Figure 3 is a fragmentary view of a portion of the indicating arrangement.

In making power and power factor determination, the observer first positions the power factor indicator 38 at the watts position corresponding to Figures 1 and 2 that is, with resistor 36 entirely removed from the circuit of winding 10. The power indication is then secured as before described and immediately the power factor knob 38 is rotated until the disc 2 comes to a full stop. The knob then indicates the power factor on scale 46. Or, if desired, the disc may be first set for power factor, and then the knob 38 returned to the watt reading position, it being appreciated that the latter is the more facile of accomplishment.

As has been implied in the foregoing, the power and power factor indications are best obtained as nearly to simultaneously as possible in some situations, as where many users are involved and there are possible rapid changes in the power factor of the combined power loads. The requisite degree of maximum elapsed time permitted may be governed by the period of vibration of the tuning fork 28, the cessation of vibration of which prevents completion of a reading by extinguishing lamp 22 and indicates the need for more dispatch in making an observation.

Having determined the watts and power factor, the reactive voltamperes may be readily computed. The voltage is usually fixed and known, but may be measured by a voltmeter mounted in the same case 8. The current can therefore be determined.

The foregoing determinations have assumed that the indicated watts were generated at standard frequency, and this assumption is substantially correct for small variations of frequency near unity power factor. Frequency is unlikely to vary far from the standard, but power factor may depart to such an extent from unity that change in frequency can affect the accuracy of the watts indication.

If, at any wattage indication of a ring 18, that ring appears to stand still when supplied with illumination from the standard frequency source, it will also stand still if, without changing the power consumption, the same frequency is supplied from the line 16. Accordingly, after first noting the reading at 24, the switch blades of 32 may be moved to energize lamp 22 from the power supply directly. Since the disc 3 is still rotating at the same speed, it appears to stand still if the supply frequency is standard. If the supply frequency is different from standard, some other ring will appear to stand still, the value of indicated wattage of which will bear a definite relationship to the disparity in line frequency from standard frequency, and from which the line frequency can be calculated, or charts provided which interpret the apparent disparity in particular wattage readings in terms of frequency disparities. This can be further improved by fixing a definite wattage indication to which the line frequency indication of wattage is always referable. This definite wattage can be supplied by auxiliary loading devices either external to, or within, the instrument housing. However, since the desired result is here accomplished in more facile manner and with less equipment, the foregoing expedients are deemed unnecessary to illustrate in the drawing.

Instead of using auxiliary charts for interpretation of apparent wattage disparities between standard and line frequencies illuminations, and instead of loading the circuit by auxiliary means so as to get a definite wattage as a basis of comparison, and in order to use the same scale markings for watts as for frequency, this invention contemplates the selection of a wattage ring as a standard of comparison which has the same digits as the digits of the supply frequency. Thus, if the frequency of supply is 60 cycles per second, the wattage selected for comparison may be any decimal multiple of 60, or, if the frequency is 25, the wattage selected for comparison may be any decimal multiple of 25.

In the present instance, with a 60 cycle standard, the ring 600 is selected. With lamp 22 excited by tuning fork standard frequency, the 600 watt ring is caused to appear to stand still by adjustment of the resistor 36, thus using that resistor for its second purpose. It is, for this purpose, immaterial whether the disc 2 indicates watts. It is only material that, at the standard frequency of illumination, it appears to stand still. It is, in effect, now operating as a frequency indicator, and the 600 watt ring is identified by the scale mark 600, which, divided by 10, equals 60.

Having secured this apparent standing still of the ring to indicate 60 cycles, the switch 32 is turned to energize lamp 22 in accordance with line frequency. If line frequency is 60 cycles, the same ring will appear to stand still. If line frequency is 59 cycles, the 590 ring will appear to stand still, which, divided by 10, is 59 cycles. If two adjacent rings appear to rotate equally slowly in opposite directions, the value of the indication, whether of frequency or of watts, lies medianly between their index values.

From the foregoing it is apparent that both frequency and watts are indicated by the same scale, their utility depending upon their method of use. This factor is of importance in a portable instrument, since obtaining results through method relieves the observer of burdensome additional apparatus. The instrument desirably provides a suitable arrangement of multiple range instrument transformers selective from a controller 59, the markings for the index of which form a multiplier for the wattage indications of scale 24.

Figure 4:
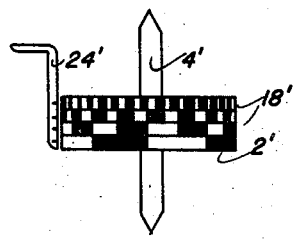
Figure 4 is an elevational view of a modified rotor.

In Figure 4 there is illustrated a modification in which the indicating rings are of equal radius, so that, the divisions of the arcs are proportional to the factor indicated thereby, and exclude the radius variable. The reference scale 24' may be fixed parallel to the axis of rotation, and the size of the two-colored arcs may be increased by increasing the radius of the cylinder 18'. The smaller the cylinder, the less is its inertia, and consequently, the greater is the sensitivity to torque change.

It is important to observe that the instrument may be used as a secondary standard for watts and frequency. Each ring 18 can be laid out on the basis of a calculation obtained from observing its speed of rotation when a known value of watts is consumed in the load. The speed of rotation can be obtained by stroboscopic measurements with a calibrated variable frequency lamp referred to a certain reference ring of no special wattage significance. After determining the correct number of two-colored arcs to place in a ring in order to cause it to appear to stand still when the known value of watts is applied and the standard frequency is applied, that ring is marked accordingly, and the scale marked with the known value of watts. Assuming uniform instrument friction, temperature, and windage losses, the instrument will provide exact values of wattage, frequency, and power factor.

The instrument can be used to determine power factor of a three phase load. By means of a suitable switch, for example, placed so that by a change of connections, the wattage indication can be secured according to the well known two wattmeter method. The advantage of this instrument, however, is that the successive indications are brought closer together in point of time because the rotor disc is highly sensitive to torque.

Having described my invention and explained the principle of its operation, both in the method and a preferred embodiment of apparatus for carrying out that method in accordance with the statute, it will be apparent that other variations of the invention may be resorted to by those skilled in the art for the purpose of accomplishing one or more of the useful results flowing therefrom without departing from the spirit of the invention. It is therefore to be understood that the disclosed embodiments are illustrative only and the following claims are referred to for a definition of that for which the invention is secured hereby.

I claim:

1. In power survey apparatus, an induction rotor, means for causing said rotor to rotate at a speed which is a function of the power consumed in a load circuit, means associated with said rotor for directly indicating the power rate of said load, means for stopping said rotor, and indicating means associated with said stopping means for indicating power factor.

2. In power survey apparatus, a rotor, means for driving said rotor at different speeds indicative of different values of an electrical condition, stroboscopic means including an electric lamp for indication of the different values of the condition, and means whereby said lamp may be illuminated at a standard frequency or at the frequency of the electrical condition.

3. In power survey apparatus, a rotor, means for driving said rotor in accordance with wattage, said means including a current circuit and a potential circuit, means associated with said rotor for indicating watts directly while the same is in motion, and a variable impedance in the potential circuit calibrated to indicate power factor when sufficient thereof is placed in the potential circuit to cause stoppage of the rotor.

4. In an electrical instrument, a rotor, electromagnetic circuits adapted to drive said rotor with a torque which is a function of the phase relation between external alternating current energy sources applied to said circuits, and a phase calibrated impedance for altering the torque to an extent sufficient to cause said rotor to stop, and thereby indicate the phase relation of said energy sources.

5. In an electrical instrument, a rotor, electromagnetic induction means producing phase displaced currents in said rotor to drive said rotor at a speed proportional to the product of currents in said induction means, and means including markings on said rotor for indicating the extent of the product of said currents and a scale associated with said markings adapted to identify the indicating marks with the value of the product of the currents.

6. In power survey apparatus, an alternating current induction rotor, means for causing said induction rotor to be energized in association with a load circuit for indicating the watts consumed, means for causing said rotor to be deenergized in association with such load circuit for indicating the load power factor, power factor indicating means associated with said deenergizing means; indicating means including stroboscopic markings on said rotor and means for producing stroboscopic light incident thereon; a source of constant frequency alternating current for said light producing means, and means for connecting said source or such load circuit to energize said light producing means.

7. In an electrical instrument, an induction rotor, magneto-motive means for driving said induction rotor at a speed which is a function of an electrical quantity, means including the rotor for indicating the values of such electrical quantity through direct observation of the rotor; said indicating means comprising an adjustable impedance, calibrated in terms of the electrical quantity, included in the magneto-motive means for varying the effectiveness of the electrical quantity on the rotor.

8. An electrical instrument comprising: watt-hour meter motive means including voltage and current windings and a rotor the movement of which is proportional to the product of the quadrature related components of currents passing through said windings, and a variable resistance in the circuit of one of said windings, said variable resistance including values of resistance capable of causing the said quadrature components of currents in the two windings to occur substantially in phase, whereby upon including such values of resistance, the rotor stops rotating, and whereby the values of such resistance indicate the value of power factor determined by the currents applied to the windings.

9. An electrical instrument comprising: motive means consisting of two windings and a rotor so related that the rotor speed is proportional to the quadrature related components of currents passing through said windings, and a variable impedance associated with said windings including values of impedance capable of causing said quadrature components of currents in the two windings to vary to any phase relation between in-phase and quadrature relation necessary in order to produce any desired condition of rotational speed of said rotor between zero speed and a maximum speed for fixed values of externally applied voltages.

10. A construction as in claim 9, with a scale and an indicator associated with said impedance for indicating the value of an electrical quantity affecting the motive means.

11. In combination, an electric motor including a rotor and magneto-motive means for causing rotation of said rotor in response to application of electrical power thereto, said magneto-motive means consisting of a pair of magneto-motive coils the respective impedances of which are such as to cause the magneto-motive effects thereof to occur out of time-phase whereby to produce rotation of the rotor in proportion to the degree of time-phase disparity; and a variable impedance of sufficient value in circuit with one of the magneto-motive coils and adjustable so as to so change the time-phase relation of currents in said coils that the rotor comes to a stop when the voltages applied to the coil circuits are in phase.

12. In an electrical instrument, an induction rotor, magneto-motive means for driving said rotor at different speeds which are a continuously variable proportional function of an electrical quantity, means including the rotor for indicating the values of such electrical quantity through direct observation of the rotor, and means whereby the motive means is influenced at will to cause indications, in conjunction with said rotor, of the values of a factor of the first mentioned electrical quantity.

OTTO A. KNOPP.